Jan. 10, 1950     K. BLACKMON     2,493,850
SAW SET

Filed Oct. 16, 1947     2 Sheets-Sheet 1

Inventor

Kenneth Blackmon

By *Clarence A. O'Brien and Harvey B. Jacobson*
Attorneys

Jan. 10, 1950

K. BLACKMON 2,493,850

SAW SET

Filed Oct. 16, 1947

Inventor

Kenneth Blackmon

By *Clarence A. O'Brien and Harvey B. Jacobson*
Attorneys

Patented Jan. 10, 1950

2,493,850

UNITED STATES PATENT OFFICE 2,493,850

SAW SET

Kenneth Blackmon, Hinsdale, N. Y.

Application October 16, 1947, Serial No. 780,146

2 Claims. (Cl. 76—68)

This invention relates to a saw set and has for its primary object to set the teeth of a conventional saw at the proper angle to prevent the saw when in use from binding against the walls of the kerf made in a piece of wood by the saw.

Another object is to hold the saw blade against buckling during the bending of a tooth.

A further object is to assure the bending of the successive teeth at the proper angle so that the set of the saw will be uniform throughout its entire length.

The above and other objects may be attained by employing this invention which embodies among its features a table, saw supporting means carried by the table, an anvil mounted on the table for vertical adjustment in spaced relation to the saw supporting means, a plunger mounted above the anvil for vertical movement toward and away from said anvil and hand actuated means to force the plunger downwardly against a saw blade mounted on the saw supporting means and bearing on the anvil.

Other features include means bearing on the saw blade adjacent the plunger to hold the blade from buckling when the plunger is moved downwardly against the blade, an inclined face on the anvil, a cooperating inclined face on the plunger, and means to rotate the plunger about its longitudinal axis so that the inclination of the face thereof may be varied relative to the inclined face of the plunger.

Figure 1:
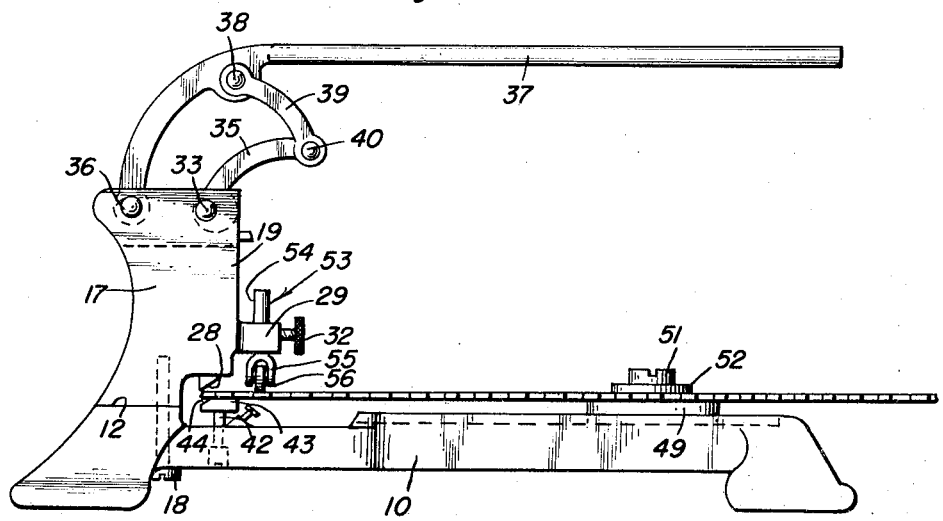
Figure 1 is a side view of a saw set embodying the features of this invention.
Figure 2:
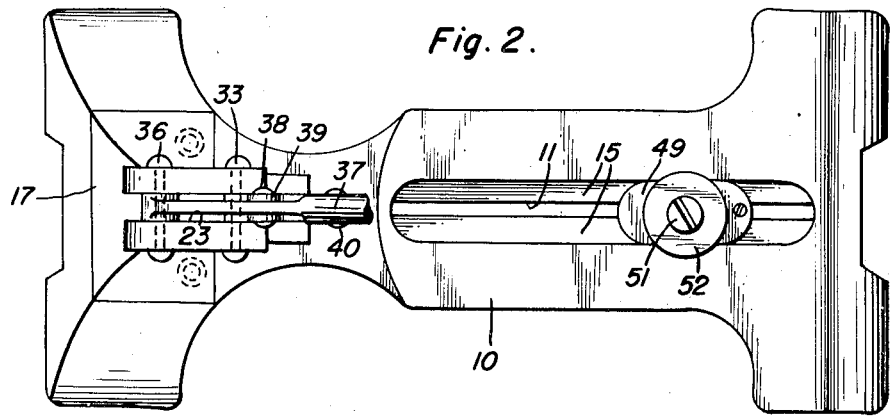
Figure 2 is a top plan view of the saw set illustrated in Figure 1.

Referring to the drawings in detail this improved saw set comprises a base 10 provided with a longitudinal slot 11, and carrying adjacent one end a pad 12 through which a bore 13 extends perpendicularly to the top face of the base 10 for a purpose to be more fully hereinafter described. Formed in the base 10 near the bore 13 is an internally screw threaded opening 14 a purpose of which will more fully hereinafter appear, and formed along the upper edge of the slot 11 is an elongated recess 15 while the opposite edges of the slot 11 are formed with similar recesses 16.

Seated on the pad 12 is a vertically extending post 17 which is held in position by means of a screw 18 entered through the opening 13 and into the post, and formed on the post is an overhanging projection 19 which extends toward the slot 15 and is formed with a vertically extending opening 20 in which a suitable guide sleeve 21 is pressed. The upper end of the opening 20 opens into an enlarged chamber 22, and the upper end of the post 17 is bifurcated as at 23 for a purpose to be more fully hereinafter explained.

Mounted for longitudinal sliding movement in the sleeve 21 is a plunger 24 provided near its upper end with an outstanding annular flange 25, and resting on the upper end of the sleeve 21 and against the under side of the flange 25 is a compression coil spring 26 which serves to yieldably hold the plunger in elevated position. Extending radially from the plunger 24 adjacent its upper end is a hand lever 27 by which the plunger may be rotated about its longitudinal axis for a purpose to be more fully hereinafter explained. Formed on the lower end of the plunger is an angular face 28 which serves to engage a saw tooth to bend it as the plunger is moved downwardly against the effort of the spring 26.

Extending outwardly toward the slotted end of the base 10 from the extension 19 near its lower end is an arm 29 which is provided with a vertically extending bore 30 which lies parallel to the opening 20 and extending through the arm 29 is an internally screw threaded bore 21 for the reception of the threaded shank of a set screw 32.

Mounted for oscillation about the horizontal axis of a supporting pin 33 which projects transversely between the arms of the bifurcated end 23 of the column 17 is a cam or eccentric 34 carrying an outwardly extending operating arm 35. This eccentric 34 is so located in the bifurcation 23 that the periphery or eccentric surface thereof contacts the upper end of the plunger 24 so that as the lever 35 is moved downwardly, the plunger 24 will be depressed against the effort of the spring 26. Pivotally mounted at 36 in the bifurcation 23 in spaced relation to the pivot 33 is a hand lever 37 to which is pivoted intermediate its ends as at 38 one end of a link 39. The opposite end of the link 39 is pivoted as at 40 to the arm 35 of the eccentric 34 so that as the hand lever 37 is moved about its pivot, the eccentric will be moved in unison therewith.

Entered into the lower end of the internally screw threaded opening 14 in the base 10 is an adjusting screw 41, and seated on the upper end of the adjusting screw and fitted into the upper end of the opening 14 is the stem 42 of an anvil 43. This anvil is provided with an inclined upper face 44 which is adapted to cooperate with the inclined face 28 on the plunger 24 in bending a saw tooth to the proper angle. A suitable set screw 45 enters the base 10 at an angle from the top surface thereof and impinges against the shank 42 of the anvil 43 in order to lock the anvil in the desired position after it has been properly adjusted by turning the adjusting screw 41.

When straight bladed saws are to be set, a plate 46 is seated on the base 10 in the grooves 15, and this plate is provided with an opening 47 for the reception of a clamping bolt which is adapted to extend downwardly through the slot 11 and fitted with a nut which engages the underside of the base 10 in order to clamp the plate 46 in the desired position on the base. A vertically extending stop 48 extends perpendicularly from the plate 46 and serves to engage the back edge of a saw blade in order to hold the teeth in proper position over the anvil 42.

When circular saws are to be set a clamp plate 49 is seated over the slot 11 in the grooves 15 and a similar clamp plate 50 engages the under side of the base 10 and seats in the grooves 16. A clamping bolt 51 extends through the plates and is equipped on its lower end with a suitable nut. This bolt 50 is adapted to extend through the usual arbor receiving opening of a conventional circular saw and a washer 52 is interposed between the saw and the head of the bolt 51 in order securely to clamp the circular saw blade in place. Obviously by loosening the bolt 51 the saw may be adjusted to bring the peripheral teeth thereof into proper position over the anvil so that when the plunger 24 is moved downwardly the tooth with which it contacts will be bent to the desired angle.

Figure 3:
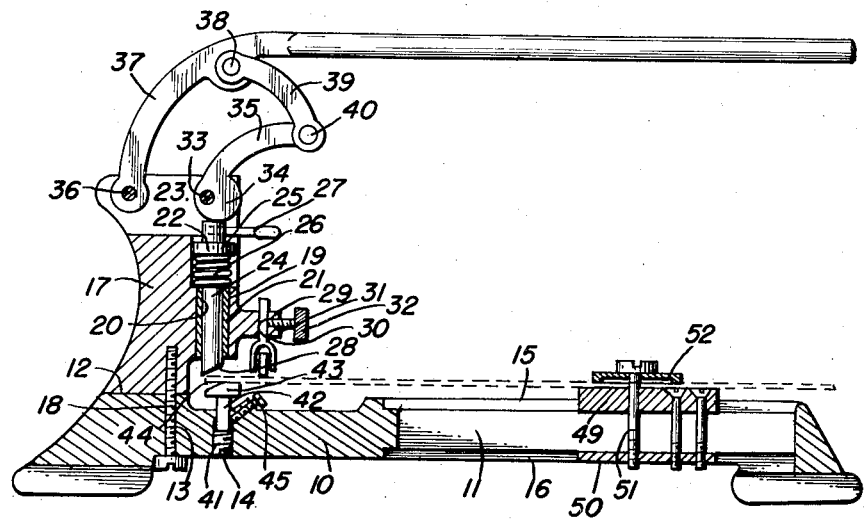
Figure 3 is a longitudinal sectional view through the saw set.
Figure 6:
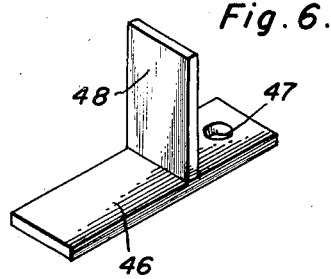
Figure 6 is a perspective view of a guide block for a conventional hand saw.
Figure 5:
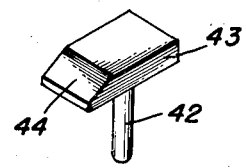
Figure 5 is a perspective view of the anvil.
Figure 4:
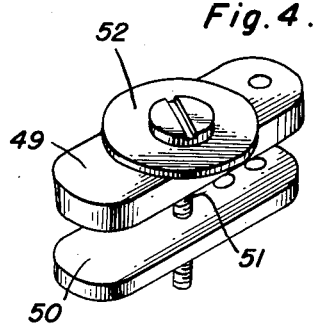
Figure 4 is a perspective view of the saw supporting member.

In order to prevent the saw blade from buckling during the exertion of pressure on a tooth thereof a suitable pressure member designated generally 53 is employed. This said pressure member comprises a shank 54 which is adapted to be entered into the opening 30 of the arm 29 and clamped therein by the set screw 32. The lower end of the shank is bifurcated as at 55 and mounted for rotation in the bifurcation is a pressure roller 56 which as illustrated in Figures 1 and 3 is adapted to bear against a saw blade near the tooth upon which the pressure is being applied. The degree of pressure exerted by the roller 56 on the saw blade may be governed by loosening the set screw 32 and moving the shank 54 toward or away from the saw blade and again tightening the set screw so that any tendency of the saw blade to buckle under the bending of a tooth thereof will be counteracted by the roller 56.

In use it will be understood that when a circular saw is to be set, it is clamped into place on the base beneath the washer 52 and so adjusted that the teeth on the periphery thereof will overlie the anvil 42 substantially as illustrated in the drawings. Upon exerting downward pressure on the hand lever 37, the plunger 24 will be lowered, thus bringing its inclined face 28 against the upper side of a saw tooth of the saw being set and bending it downwardly against the inclined face 44 of the anvil 42. Buckling of the saw blade will be prevented by its engagement with the pressure roller 56. After setting a tooth on the saw blade, the latter is rotated about the bolt 51 to bring the next desired tooth into line for operation and when the next tooth has been properly aligned, the plunger is again depressed. By rotating the plunger about its longitudinal axis through the medium of the lever 37 it will be evident that the angular relation of the inclined face 28 thereof, to the inclined face 44 of the anvil 42 may be varied to suit various different requirements.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A saw set comprising a table, an anvil mounted near one end of the table for vertical adjustment, saw supporting means mounted on the table for adjustment toward or away from the anvil, said anvil having an inclined face over which projects a saw tooth carried by a saw blade mounted on the saw supporting means, a post carried at said one end of said table, a plunger mounted on said post above the anvil for vertical movement toward and away from the table, resilient means normally urging said plunger away from said anvil, an inclined face on the lower end of the plunger for engagement with the saw tooth that projects over the anvil, a hand lever carried by said plunger for rotating the same about its longitudinal axis to move the inclined face thereon into various angular positions relative to the inclined face on the anvil, a presser roller mounted for vertical adjustment on said post adjacent said plunger, and means to advance the plunger toward the anvil to bend the projecting saw tooth relative to the saw blade.

2. The combination of claim 1 wherein said means includes a lever pivoted to said post above said plunger, said lever including a cam adapted to engage the upper end of said plunger and depress the same against action of said resilient means upon a downward movement of said lever.

KENNETH BLACKMON.

REFERENCES CITED

The following references are of record in the file of this patent:

UNITED STATES PATENTS

| Number | Name | Date |
|---|---|---|
| 468,577 | Reck | Feb. 9, 1892 |
| 554,721 | Packwood | Feb. 18, 1896 |
| 769,385 | Huot | Sept. 6, 1904 |
| 855,616 | Glendenon | June 4, 1907 |
| 1,205,072 | Anderson et al. | Nov. 14, 1916 |
| 1,258,734 | Anderson et al. | Mar. 12, 1918 |
| 1,397,331 | Rinne | Nov. 15, 1921 |
| 1,439,144 | Casebeer | Dec. 19, 1922 |
| 1,850,987 | Weseman | Mar. 22, 1932 |
| 2,425,876 | Hively | Aug. 19, 1947 |